(12) United States Patent
Iyer et al.

(10) Patent No.: US 8,827,446 B2
(45) Date of Patent: Sep. 9, 2014

(54) ELECTRONIC LENS COMPRISED OF HYBRID MATERIALS

(75) Inventors: Venkatramani Iyer, Roanoke, VA (US); Robert S. Hall, Roanoke, VA (US); Randall Blevins, Troutville, VA (US); Ronald Blum, Roanoke, VA (US); William Kokonaski, Gig Harbor, WA (US)

(73) Assignee: HPO Assets LLC, Farmington, CT (US)

( * ) Notice: Subject to any disclaimer, the term of this patent is extended or adjusted under 35 U.S.C. 154(b) by 233 days.

(21) Appl. No.: 13/418,038

(22) Filed: Mar. 12, 2012

(65) Prior Publication Data

US 2012/0229754 A1 Sep. 13, 2012

Related U.S. Application Data

(60) Provisional application No. 61/451,159, filed on Mar. 10, 2011.

(51) Int. Cl.
*G02C 7/02* (2006.01)
*G02C 7/08* (2006.01)

(52) U.S. Cl.
CPC ..................... *G02C 7/083* (2013.01)
USPC ............. 351/159.03; 351/159.05; 351/159.11

(58) Field of Classification Search
USPC ........................ 351/159.01–159.72
See application file for complete search history.

(56) References Cited

U.S. PATENT DOCUMENTS

2008/0278681 A1* 11/2008 Blum et al. .................. 351/169
2009/0256977 A1 10/2009 Haddock et al.

OTHER PUBLICATIONS

U.S. Appl. No. 61/451,159, filed Mar. 11, 2011.
U.S. Appl. No. 13/045,961, filed Mar. 11, 2011.

* cited by examiner

*Primary Examiner* — Scott J Sugarman
*Assistant Examiner* — Robert E Tallman
(74) *Attorney, Agent, or Firm* — Sterne, Kessler, Goldstein & Fox P.L.L.C.

(57) ABSTRACT

Embodiments described herein may provide an electro-active lens. The electro-active lens may comprise a first substrate, a second substrate, and an electro-active element disposed between the first substrate and the second substrate. The electro-active element may be configured to alter the optical power of at least a portion of the electro-active lens. The first substrate may comprise a different material than the second substrate.

17 Claims, 6 Drawing Sheets

ELECTRONIC LENS COMPRISED OF HYBRID MATERIALS

CROSS-REFERENCES TO RELATED APPLICATIONS

This application claims benefit under 35 U.S.C. §119(e) of U.S. provisional patent application No. 61/451,159, filed on Mar. 10, 2011, the entire disclosure of which is incorporated herein by reference for all purposes.

BACKGROUND OF THE INVENTION

Electronic (i.e. "electro-active") lenses that are configured to alter their focus by way of passing an electrical potential across liquid crystal disposed (i.e. sandwiched) between two substrates comprising electrodes are known. In the case of a pixilated electronic lens the electrodes may be individually addressable and thus multiple electrodes may be required, but in the case of a surface relief diffractive optic or lens only two electrodes are generally needed; one on the top substrate and one on the bottom.

BRIEF SUMMARY OF THE INVENTION

Embodiments provided herein may comprise an electronic (or "electro-active") lens, and devices that comprise an electro-active lens, having an electro-active element (such a liquid crystal layer) disposed between two substrates, where the substrates comprise different materials (such as glass and plastic or two different types of plastic material). This may, for instance, provide an electro-active lens that may take advantage of some of the advantages that are associated with each of the different types of materials. Some embodiments may utilize an adhesive (such as an epoxy or resin) to couple the first and second substrate that has properties that allow for differential thermal expansion and cycling of the substrate materials. Some embodiments may also comprise a diffractive element and/or a pixilated element (e.g. pixilated electrodes) that may be utilized to change the optical properties of the lens. For some embodiments that comprise a diffractive optical feature disposed on one of the substrates, the refractive indices of the electro-active element and the substrate that comprises the diffractive element may be matched.

Some embodiments described herein may provide an electro-active lens. The electro-active lens may comprise a first substrate, a second substrate, and an electro-active element disposed between the first substrate and the second substrate. The electro-active element may be configured to alter the optical power of at least a portion of the electro-active lens. The first substrate may comprise a different material than the second substrate.

In some embodiments, in the electro-active lens as described above, the first substrate may have a front surface and a back surface, the second substrate may have a front surface and a back surface, the front surface of the first substrate and the back surface of the second substrate may define a first cavity; and the electro-active element is disposed within the first cavity.

In some embodiments, the electro-active lens as described above may further comprise an adhesive layer that is disposed between the first substrate and the second substrate, where the first substrate and the second substrate are coupled together by the adhesive layer. In some embodiments, the adhesive layer may be a visco-elastic material and have a glass transition temperature in the range of 0-20° C. In some embodiments, the adhesive layer may comprise any one of, or some combination of, the following: urethane prepolymers, thio-urethane prepolymers, vinyl resins, thiols, allylic or vinyl phenols, acrylic monomers and oligomers, photo-initiators, stabilizers and inhibitors, naphthalene compounds, or silanes.

In some embodiments, in the electro-active lens as described above comprising an adhesive layer, the adhesive may comprise silane, the first substrate may comprise MR 10 plastic, and the second substrate may comprise a glass material. In some embodiments, the first and second substrates may comprise any of the following materials pairs (first substrate/second substrate):
MR8/glass
MR7/glass
MR10/MR8
Polycarbonate/glass
Acrylate/glass
Trivex/glass
PSU/glass
PPSU/glass
MR10/polycarbonate In some embodiments, in the electro-active lens as described above, the first substrate may have a coefficient of thermal expansion that is at least approximately 10% different than the coefficient of thermal expansion of the second substrate. In some embodiments, the first substrate may have a coefficient of thermal expansion that is at least approximately 15% different than the coefficient of thermal expansion of the second substrate. In some embodiments, the first substrate may have a coefficient of thermal expansion that is at least approximately 20% different than the coefficient of thermal expansion of the second substrate.

In some embodiments, in the electro-active lens as described above, the first substrate has a coefficient of linear thermal expansion between approximately $5 \times 10^{-5}$ and $7 \times 10^{-5}/°$ C., and wherein the second substrate has a coefficient of linear thermal expansion between approximately $7 \times 10^{-5}$ and $9 \times 10^{-5}/°$ C.

In some embodiments, in the electro-active lens as described above, the first substrate may have a flexural strength that is at least approximately 10% different than the flexural strength of the second substrate. In some embodiments, the first substrate may have a flexural strength that is at least approximately 30% different than the flexural strength of the second substrate. In some embodiments, the first substrate may have a flexural strength that is at least approximately 50% different than the flexural strength of the second substrate. In some embodiments, the first substrate has a flexural strength between approximately 10,000 and 15,000 PSI, and wherein the second substrate has a flexural strength between approximately 15,000 and 20,000 PSI.

In some embodiments, in the electro-active lens as described above, the first substrate may have a coefficient of linear thermal expansion between approximately $5 \times 10^{-5}$ and $7 \times 10^{-5}/°$ C., the second substrate may have a coefficient of linear thermal expansion between approximately $7 \times 10^{-5}$ and $9 \times 10^{-5}/°$ C., the first substrate may have a flexural strength between approximately 10,000 and 15,000 PSI, and the second substrate may have a flexural strength between approximately 15,000 and 20,000 PSI.

In some embodiments, the electro-active lens as described may further comprise a diffractive element or a pixilated element.

In some embodiments, in the electro-active lens as described above, the first substrate may comprise a plastic material and the second substrate may comprise glass.

In some embodiments, in the electro-active lens as described above where the first substrate comprises a plastic material and the second substrate comprises glass, the first substrate that comprises plastic may comprise any one of: MR10, MR8, MR7, polycarbonate, Trivex, CR39, PSU, PPSU, or acrylate.

In some embodiments, in the electro-active lens as described above where the first substrate comprises a plastic material and the second substrate comprises glass, the first substrate that comprises plastic may comprise a MR-series material and the second substrate that comprises glass may comprise transparent glass.

In some embodiments, in the electro-active lens as described above where the first substrate comprises a plastic material and the second substrate comprises glass, the first substrate may have a front surface and a back surface, the second substrate may have a front surface and a back surface, and the front surface of the first substrate may be disposed opposite to the back surface of the second substrate. In some embodiments, the front surface of the first substrate may comprise a diffractive element or a pixilated element. In some embodiments, the first substrate may have an index of refraction and refractive index (RI) dispersion that match the index of refraction and refractive index dispersion of the electro-active element when the electro-active element is in an inactive state. In some embodiments, the first substrate may have an index of refraction that is within approximately 10% of the index of refraction of the electro-active element when in an inactive state.

In some embodiments, in the electro-active lens as described above, where the first substrate comprises a plastic material and the front surface of the first substrate comprises a diffractive element or a pixilated element, the first substrate has an index of refraction of approximately 1.67.

In some embodiments, in the electro-active lens as described above, where the first substrate comprises a plastic material and the front surface of the first substrate comprises a diffractive element or a pixilated element, the first substrate may have a thickness that is less than approximately 1.5 mm In some embodiments, in the electro-active lens as described above, where the first substrate comprises a plastic material, the back surface of the second substrate may include a diffractive element or a pixilated element. In some embodiments, the second substrate may have an index of refraction that is approximately equal to the index of refraction of the electro-active element when the electro-active element is in an inactive state. In some embodiments, the second substrate may have an index of refraction that is within approximately 10% of the index of refraction of the electro-active element when in an inactive state. In some embodiments, the second substrate may have an index of refraction of approximately 1.67.

In some embodiments, in the electro-active lens as described above, where the first substrate comprises a plastic material and the second substrate comprises a glass material, the second substrate may have a thickness that is less than approximately 1.5 mm. In some embodiments, the second substrate may have a thickness that is less than approximately 1.0 mm. In some embodiments, the second substrate may have a thickness that is less than approximately 0.5 mm.

In some embodiments, in the electro-active lens as described above, where the first substrate comprises a plastic material and the second substrate comprises a glass material, the second substrate may have a thickness that is greater than the thickness of the first substrate. In some embodiments, the second substrate may have a thickness that is less than the thickness of the first substrate. In some embodiments, the second substrate has a thickness that is approximately equal to the thickness of the first substrate.

In some embodiments, in the electro-active lens as described above, where the first substrate comprises a plastic material and the second substrate comprises a glass material, the first substrate may have a thickness that is between approximately 1.0 and 3.0 mm; and wherein the second substrate has a thickness between approximately 0.1 and 1.0 mm.

In some embodiments, in the electro-active lens as described above, where the first substrate comprises a plastic material and the second substrate comprises a glass material, the first substrate comprises a semi-finished lens blank. In some embodiments, the first substrate may be configured to be edged, grinded, or polished.

In some embodiments, in the electro-active lens as described above, where the first substrate comprises a plastic material and the second substrate comprises a glass material, the first substrate may have a progressive addition surface. In some embodiments, the progressive addition surface may be disposed on the back surface of the first substrate.

In some embodiments, in the electro-active lens as described above, where the first substrate comprises a plastic material and the second substrate comprises a glass material, the second substrate may be photochromatic.

In some embodiments, in the electro-active lens as described above, where the first substrate comprises a plastic material and the second substrate comprises a glass material, the electro-active lens may further comprise an anti-reflective layer disposed on the front surface of the second substrate.

In some embodiments, in the electro-active lens as described above, the first substrate may comprise a first plastic material and the second substrate may comprise a second plastic material, where the first plastic material and the second plastic material are different.

In some embodiments, in the electro-active lens as described above where the first substrate comprises a first plastic material and the second substrate comprises a second plastic material, the first substrate and the second substrate may comprise any one of: MR10, MR8, MR7, polycarbonate, Trivex, CR39, PSU, PPSU, or acrylate.

In some embodiments, in the electro-active lens as described above where the first substrate comprises a first plastic material and the second substrate comprises a second plastic material, the first substrate may comprises Trivex and the second substrate may comprise CR39.

In some embodiments, in the electro-active lens as described above where the first substrate comprises a first plastic material and the second substrate comprises a second plastic material, the first substrate may have a front surface and a back surface, the second substrate may have a front surface and a back surface, and the front surface of the first substrate may be disposed opposite to the back surface of the second substrate.

In some embodiments, in the electro-active lens as described above where the first substrate comprises a first plastic material and the second substrate comprises a second plastic material, the front surface of the first substrate may comprise a diffractive element or a pixilated element. In some embodiments, first substrate may have an index of refraction that is approximately equal to the index of refraction of the electro-active element when in an inactive state.

In some embodiments, in the electro-active lens as described above where the first substrate comprises a first plastic material, the second substrate comprises a second plastic material, and the front surface of the first substrate comprises a diffractive element or a pixilated element, the first substrate may have an index of refraction that is within approximately 10% of the index of refraction of the electro-active element when the electro-active element is in an inactive state.

In some embodiments, in the electro-active lens as described above where the first substrate comprises a first plastic material, the second substrate comprises a second plastic material, and the front surface of the first substrate comprises a diffractive element or a pixilated element, the first substrate may have an index of refraction of approximately 1.67.

In some embodiments, in the electro-active lens as described above where the first substrate comprises a first plastic material, the second substrate comprises a second plastic material, and the front surface of the first substrate comprises a diffractive element or a pixilated element, the first substrate may have a thickness that is less than approximately 1.5 mm In some embodiments, in the electro-active lens as described above where the first substrate comprises a first plastic material and the second substrate comprises a second plastic material, the back surface of the second substrate may comprise a diffractive element or a pixilated element.

In some embodiments, in the electro-active lens as described above where the first substrate comprises a first plastic material, the second substrate comprises a second plastic material, and the back surface of the second substrate comprises a diffractive element or a pixilated element, second substrate may have an index of refraction that is approximately equal to the index of refraction of the electro-active element when in an inactive state.

In some embodiments, in the electro-active lens as described above where the first substrate comprises a first plastic material, the second substrate comprises a second plastic material, and the back surface of the second substrate comprises a diffractive element or a pixilated element, the second substrate may have an index of refraction that is within approximately 10% of the index of refraction of the electro-active element when the electro-active element is in an inactive state.

In some embodiments, in the electro-active lens as described above where the first substrate comprises a first plastic material, the second substrate comprises a second plastic material, and the back surface of the second substrate comprises a diffractive element or a pixilated element, the second substrate may have an index of refraction of approximately 1.67.

In some embodiments, in the electro-active lens as described above where the first substrate comprises a first plastic material, the second substrate comprises a second plastic material, and the back surface of the second substrate comprises a diffractive element or a pixilated element, the second substrate may have a thickness that is less than approximately 1.0 mm. In some embodiments, the second substrate may have a thickness that is less than approximately 0.5 mm In some embodiments, in the electro-active lens as described above where the first substrate comprises a first plastic material and the second substrate comprises a second plastic material, the second substrate may have a thickness that is greater than the thickness of the first substrate. In some embodiments, the second substrate may have a thickness that is less than the thickness of the first substrate. In some embodiments, the second substrate may have a thickness that is approximately equal to the thickness of the first substrate.

In some embodiments, in the electro-active lens as described above where the first substrate comprises a first plastic material, the second substrate comprises a second plastic material, the first substrate may have a thickness that is between approximately 0.3 mm and 0.7 mm and the second substrate may have a thickness that is between approximately 0.5 mm and 2.5 mm.

In some embodiments, in the electro-active lens as described above where the first substrate comprises a first plastic material and the second substrate comprises a second plastic material, the first substrate may comprise a semi-finished lens blank. In some embodiments, the first substrate may comprise a progressive addition surface. In some embodiments, the progressive addition surface may be disposed on the back surface of the first substrate.

In some embodiments, in the electro-active lens as described above where the first substrate comprises a first plastic material and the second substrate comprises a second plastic material, the second substrate may be photochromatic.

In some embodiments, in the electro-active lens as described above where the first substrate comprises a first plastic material and the second substrate comprises a second plastic material, the second substrate the second substrate may comprise polycarbonate or nylon.

DETAILED DESCRIPTION OF THE INVENTION

Figure 1:
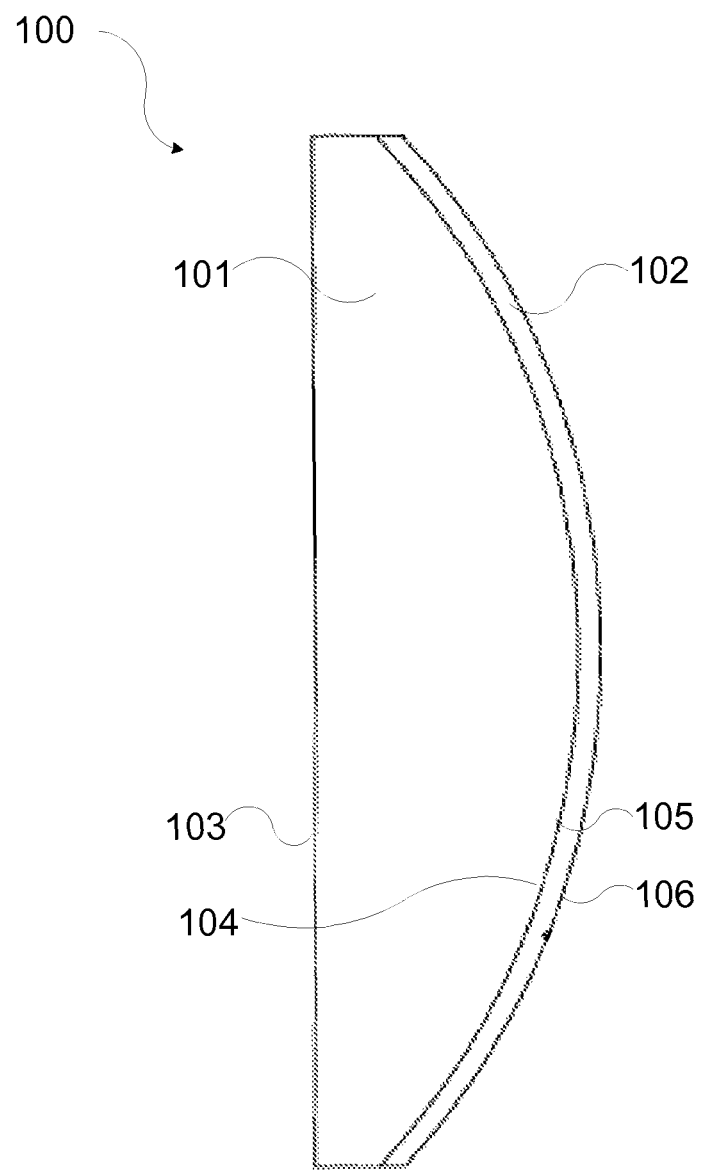
FIG. 1 shows a high-level side-view of an exemplary electro-active lens in accordance with some embodiments.

Some terms that are used herein are described in further detail as follows:

As used herein, "add power" may refer to the optical power added to the far distance viewing optical power which is required for clear near distance viewing in a multifocal lens. For example, if an individual has a far distance viewing prescription of −3.00 D with a +2.00 D add power for near distance viewing then the actual optical power for near distance is −1.00 D. Add power may sometimes be referred to as plus power. Add power may be further distinguished by referring to "near viewing distance add power," which refers to the add power in the near viewing distance portion of the optic and "intermediate viewing distance add power" may refer to the add power in the intermediate viewing distance portion of the optic. Typically, the intermediate viewing distance add power may be approximately 50% of the near viewing distance add power. Thus, in the example above, the individual would have +1.00 D add power for intermediate distance viewing and the actual total optical power in the intermediate viewing distance portion of the optic is −2.00 D.

As used herein, the term "alignment layer" may refer to a layer of material that controls the alignment of liquid crystals in the absence of an external field and often adheres to the surface of a substrate (such as an electrode, a lens, lens blank, lens wafer, etc.).

As used herein, the term "approximately" may refer to plus or minus 10 percent, inclusive. Thus, the phrase "approximately 10 mm" may be understood to mean from 9 mm to 11 mm, inclusive.

As used herein, the term "comprising" is not intended to be limiting, but may be a transitional term synonymous with "including," "containing," or "characterized by." The term "comprising" may thereby be inclusive or open-ended and does not exclude additional, unrecited elements or method steps when used in a claim or to describe an embodiment. For instance, in describing a method, "comprising" indicates that the claim is open-ended and allows for additional steps. In describing a device, "comprising" may mean that a named element(s) may be essential for an embodiment, but other elements may be added and still form a construct within the scope of a claim. In contrast, the transitional phrase "consisting of" excludes any element, step, or ingredient not specified in a claim. This is consistent with the use of the term throughout the specification.

As used herein, a "conductive path" refers to a continuous path for which electrons (i.e. current) may flow from one point to another. The conductive path may comprise one component, or more than one component. For instance, a conductive path may comprise portions of a lens housing, a temple, a hinge, a lens, and/or conductive material disposed between (or within) some or all of the components.

As used herein, "coupled" may refer to any manner of connecting two components together in any suitable manner, such as by way of example only: attaching (e.g. attached to a surface), disposing on, disposing within, disposing substantially within, embedding within, embedded substantially within, etc. "Coupled" may further comprise fixedly attaching two components (such as by using a screw or embedding a first component into a second component during a manufacturing process), but does not so require. Two components may be coupled temporarily simply by being in physical contact with one another. Two components are "electrically coupled" or "electrically connected" if current can flow from one component to another. That is, the two components do not have to be in direct contact such that current flows from the one component directly to the other component. There may be any number of other conductive materials and components disposed electrically between two components "electrically coupled" so long as current can flow there between.

As used herein, a "diffractive element" may refer to a diffractive pattern that may be disposed on the surface of a substrate such as, by way of example only, etching, grinding or molding the surface. Such an optic may comprise a physical structure which is patterned to have a fixed optical power and/or aberration correction, by way of a surface relief diffractive topological profile.

As used herein, a "dynamic lens" may refer to a lens with an optical power which is alterable with the application of electrical energy, mechanical energy or force. Either the entire lens may have an alterable optical power, or only a portion, region or zone of the lens may have an alterable optical power. The optical power of such a lens is dynamic or tunable such that the optical power can be switched between two or more optical powers. The switching may comprise a discrete change from one optical power to another (such as going from an "off" or inactive state to an "on" or active state) or it may comprise continuous change from a first optical power to a second optical power, such as by varying the amount of electrical energy to a dynamic element (e.g. tunable). One of the optical powers may be that of substantially no optical power. A dynamic lens may also be referred to as a dynamic optic, a dynamic optical element, a dynamic optical zone, dynamic power zone, or a dynamic optical region.

As used herein, an "electronic component" or "electrical component" may refer to any electronic device or component thereof, including a power source, a controller (such as a microprocessor or application-specific integrated circuit (ASIC)), a sensing mechanism (such as a touch switch—e.g. capacitive switch or membrane switch-, optical sensor, accelerometer, gyroscope, vibration sensor, etc.), flexible circuit, printed circuit board, electrical connectors, or any other device or component that may be coupled to, and/or disposed on, an electronic frame.

As used herein, a "far viewing distance" may refer to the distance to which one looks, by way of example only, when viewing beyond the edge of one's desk, when driving a car, when looking at a distant mountain, or when watching a movie. This distance is usually, but not always, considered to be approximately 10 feet or greater from the eye. The far viewing distance may also be referred to as a far distance and a far distance point.

As used herein, a "frame" may refer to a complete wearable housing that secures both spectacle lenses and aligns them in the proper place relative to the wearer's eyes when being worn. The frame may comprise elements such as a first and second temple, a lens housing that is configured to support the spectacle lenses, one or more hinges, and any other related component.

As used herein, an "intermediate viewing distance" may refer to the distance to which one looks, by way of example only, when reading a newspaper, when working on a computer, when washing dishes in a sink, or when ironing clothing. This distance is usually, but not always, considered to be between approximately 20 inches and approximately 4 feet from the eye. The intermediate viewing distance may also be referred to as an intermediate distance and an intermediate distance point.

As used herein, the term "layer" does not require a uniform thickness of material. For example, a layer may comprise some imperfections or uneven thicknesses so long as the layer performs its intended purpose.

As used herein, a "lens" may refer to any device or portion of a device that causes light to converge or diverge. The device may be static or dynamic. A lens may be refractive or diffractive. A lens may be concave, convex or plano on one or both surfaces. A lens may be spherical, cylindrical, prismatic or a combination thereof. A lens may be made of optical glass, plastic or resin. A lens may also be referred to as an optical element, an optical zone, an optical region, an optical power region or an optic. It should be noted that within the optical industry a lens can be referred to as a lens even if it has zero optical power. Moreover, a lens may refer to both intra-ocular and extra-ocular components.

As used herein, a "lens blank" may refer to an optical material that may be shaped into a lens. A lens blank may be finished meaning that the lens blank has been shaped to have an optical power on both external surfaces. A lens blank may be semi-finished meaning that the lens blank has been shaped to have an optical power on only one external surface. A lens blank may be unfinished meaning that the lens blank has not been shaped to have an optical power on either external surface. A surface of an unfinished or semi-finished lens blank may be finished by means of a fabrication process known as free-forming or by more traditional surfacing and polishing.

As used herein, a "multi-focal lens" may refer to a lens having more than one focal point or optical power. Such lenses may be static or dynamic. Examples of static multifocal lenses include a bifocal lens, trifocal lens or a Progressive Addition Lens. Examples of dynamic multifocal lenses include electro-active lenses whereby various optical powers may be created in the lens depending on the types of electrodes used, voltages applied to the electrodes and index of refraction altered within a thin layer of liquid crystal. Multifocal lenses may also be a combination of static and dynamic. For example, an electro-active element may be used in optical communication with a static spherical lens, static single vision lens, and static multifocal lens such as, by way of example only, a Progressive Addition Lens.

As used herein, a "near viewing distance" may refer to the distance to which one looks, by way of example only, when reading a book, when threading a needle, or when reading instructions on a pill bottle. This distance is usually, but not always, considered to be between approximately 12 inches and approximately 20 inches from the eye. The near viewing distance may also be referred to as a near distance and a near distance point.

As used herein, an "ophthalmic lens" may refer to a lens suitable far vision correction which includes a spectacle lens, a contact lens, an intra-ocular lens, a corneal in-lay, and a corneal on-lay.

As used herein, "optical communication" may refer to the condition whereby two or more optics of given optical power are aligned in a manner such that light passing through the aligned optics experiences a combined optical power equal to the sum of the optical powers of the individual elements.

As used herein, "pixilated electrodes" may refer to electrodes that may be utilized in an electro-active lens that are individually addressable regardless of the size, shape, and arrangement of the electrodes. Furthermore, because the electrodes are individually addressable, any arbitrary pattern of voltages may be applied to the electrodes. For example, pixilated electrodes may be squares or rectangles arranged in a Cartesian array or hexagons arranged in a hexagonal array. Pixilated electrodes need not be regular shapes that fit to a grid. For example, pixilated electrodes maybe concentric rings if every ring is individually addressable. Concentric pixilated electrodes may be individually addressed to create a diffractive optical effect.

As used herein, a "progressive addition region" or "progressive addition zone" may refer to a lens having a first optical power in a first portion of the region and a second optical power in a second portion of the region wherein a continuous change in optical power exists there between. For example, a region of a lens may have a far viewing distance optical power at one end of the region. The optical power may continuously increase in plus power across the region, to an intermediate viewing distance optical power and then to a near viewing distance optical power at the opposite end of the region. After the optical power has reached a near-viewing distance optical power, the optical power, may decrease in such a way that the optical power of this progressive addition region transitions back into the far viewing distance optical power. A progressive addition region may be on a surface of a lens or embedded within a lens. When a progressive addition region is on the surface and comprises a surface topography it may be known as a progressive addition surface.

As used herein, a "static lens" or "static optic" may refer to a lens having a optical power which is not alterable with the application of electrical energy, mechanical energy or force. Examples of static lenses include spherical lenses, cylindrical lenses, Progressive Addition Lenses, bifocals, and trifocals. A static lens may also be referred to as a fixed lens. A lens may comprise a portion that is static, which may be referred to as a static power zone, segment, or region.

DESCRIPTION OF EMBODIMENTS

Over the last several decades, manufacturers of lenses have moved away from the use of glass lenses because of the additional weight of the material (which may not be comfortable on a wearer's face) as well as other reasons such as the safety hazards associated with glass lenses if they are to break. Indeed, static lenses very rarely comprise glass lenses today.

More recently, electro-active lenses have emerged as potentially viable for daily use ophthalmic devices and other types of eyewear. The use of electro-active materials allows many advantages, including dynamic optical powers and the ability to provided additional optical add power without the use of shaped or curved surfaces. Presently electronic lenses used for ophthalmic applications, contact lenses, intra-ocular lenses, spectacle lenses, and many other applications comprise an upper (e.g. "front") and lower (e.g. "back") substrate material that is a plastic material. As used in this context and herein, the "front" substrate refers to the substrate that may be disposed farthest from the wearer's head when a device comprising the electro-active lens is worn. Similarly, the "back" substrate refers to the substrate that may be disposed nearest to the wearer's head when a device comprising the electro-active lens is worn. This is generally done to reduce the weight of the device (e.g. ophthalmic lens) thus providing added comfort (e.g. in the case of spectacle lenses) and/or better centering (e.g. in the case of contact lenses and intra-ocular lenses). Moreover, it is generally believed that the use of electro-active elements (such as a liquid crystal layer) should be index matched to the substrates to provide a desired optical property. That is, if the substrates and the liquid crystal layer have substantially different refractive indices, then the optical properties of the lens may be altered based on the effect on light at the interface between the two regions with different refractive indices.

Moreover, electro-active lenses often comprise a diffractive element or a pixilated element that is used in combination with a electro-active element to provide a dynamic optic with a predetermined optical features. In such devices, the substrate comprising the diffractive or pixilated element is typically designed to match the index of refraction of the liquid crystal layer when the electrical power is turned "off." This increases the cost of such electronic lenses because the substrate material comprises high index plastic material (to match that high index of refraction of the electro-active element), which is relatively expensive.

In addition, when making one of the generally thin plastic front substrates of an ophthalmic spectacle electronic lens photochromatic, the thin plastic front substrate is subjected to a high amount of heat, which may (in many cases) warp or change the curvature of the thin front substrate. The result of this process is lower yields and even higher costs. Thus, the inventors have found that there is a need for a composite structure of an electronic lens for ophthalmic applications that may bring cost down, improve manufacturing, and/or improve performance to better allow for market penetration and acceptance of electro-active lenses.

Embodiments provided herein may comprise hybrid electronic lenses having two substrates comprised of two different materials. In a first embodiment (i.e. "#1"), the front substrate may be that of glass material and the back substrate may be that of a plastic material. In a second embodiment (i.e. "#2"), the front substrate may be made of plastic and the back substrate may be made of plastic, but the type of plastic used for the front substrate is different from that of the back substrate. Although embodiments will be described below with reference to the first embodiments (#1) and the second embodiments (#2), it should be appreciated that embodiments are not limited to these examples. That is, any two materials may be used in some instances to provide a hybrid (or composite) electro-active lens that comprises two substrates that comprise different materials. Moreover, although the first exemplary embodiment (#1) may be described with reference to a preferred embodiment in which the front substrate comprises glass and the back substrate comprises plastic, embodiments are not so limited (e.g. the back substrate could comprise a glass material). As would be understood by one of ordinary skill in the art after reading this disclosure, various combinations of materials may be used for the first and second substrates. Such materials and combinations may be chosen based on the particular application that the electro-active lens is expected to be utilized for, including taking into consideration such factors as durability, costs, weight, and aesthetics.

In some instances, there may be two subsets (referred to herein as subset "X" and subset "Z") of each of the two exemplary embodiments noted above. With each subset "X," the diffractive or pixilated element of the electro-active lens may be disposed on the front surface of the back substrate (which may be internal to the finished electronic lens); and with each subset "Z," the diffractive or pixilated element may be disposed on the back surface of the front substrate (which may also be internal to the finished electronic lens).

With reference to the figures provided herein, a brief description of the general structure of some examples of electro-active lenses that have two substrates that comprise different materials is provided in accordance with some embodiments. Additional descriptions of the components shown and described therein will be provided below. It should be noted that although common features are described below by using the same reference numbers, the embodiments of lenses shown in FIGS. 1-5 are not intended necessarily comprises a single embodiment. Moreover, features in some embodiments may have been omitted or added for illustration purposes, such as to, for instance, more readily explain or show concepts and designs at a higher level or in more detail.

With reference to FIG. 1, an exemplary electro-active lens 100 is shown comprising a first substrate (e.g. back substrate) 101 having a back surface 103 and front surface 104, a second substrate (e.g. front substrate) 102 having a back surface 105 and a front surface 106. The front surface 104 of the first substrate 101 is shown as being disposed opposite the back surface 105 of the second substrate 106. As described below, the first 101 and second 102 substrates may comprise different materials. The electro-active element and related components and layers of the electro-active lens 100 in FIG. 1 have been omitted for illustration purposes only.

Figure 2:
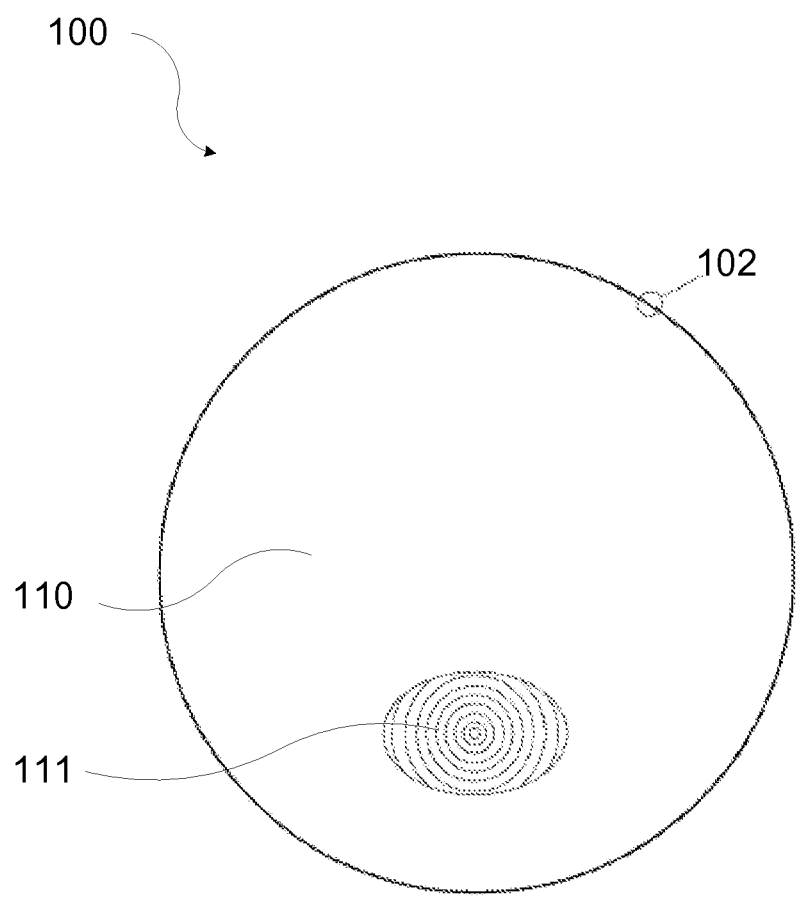
FIG. 2 shows a front view of an exemplary electro-active lens in accordance with some embodiments.

With reference to FIG. 2, a front view of the exemplary electro-active lens 100 is shown (i.e. viewing the lens from the front surface 106 of the second—i.e. front-substrate 102). The electro-active lens 100 is shown as having an electro-active region 111 (e.g. a region of the lens that is in optical communication with an electro-active element (such as a liquid crystal layer) and a first region 110 that is not in optical communication with the electro-active region 111. It should be understood that while the electro-active region 111 is shown for illustration purposes as comprising a portion of the electro-active lens 100, embodiments are not so limited. For example, the electro-active region 111 may comprise any portion of the electro-active lens 100, be located in any position on the electro-active lens 100, and have any suitable shape. Moreover, embodiments may comprise one, or more than one, electro-active region 111. In some embodiments, the electro-active region 111 could provide all of an add power or only a portion of an add power (such as when the electro-active region 111 is in optical communication with a progressive addition surface).

Figure 3:
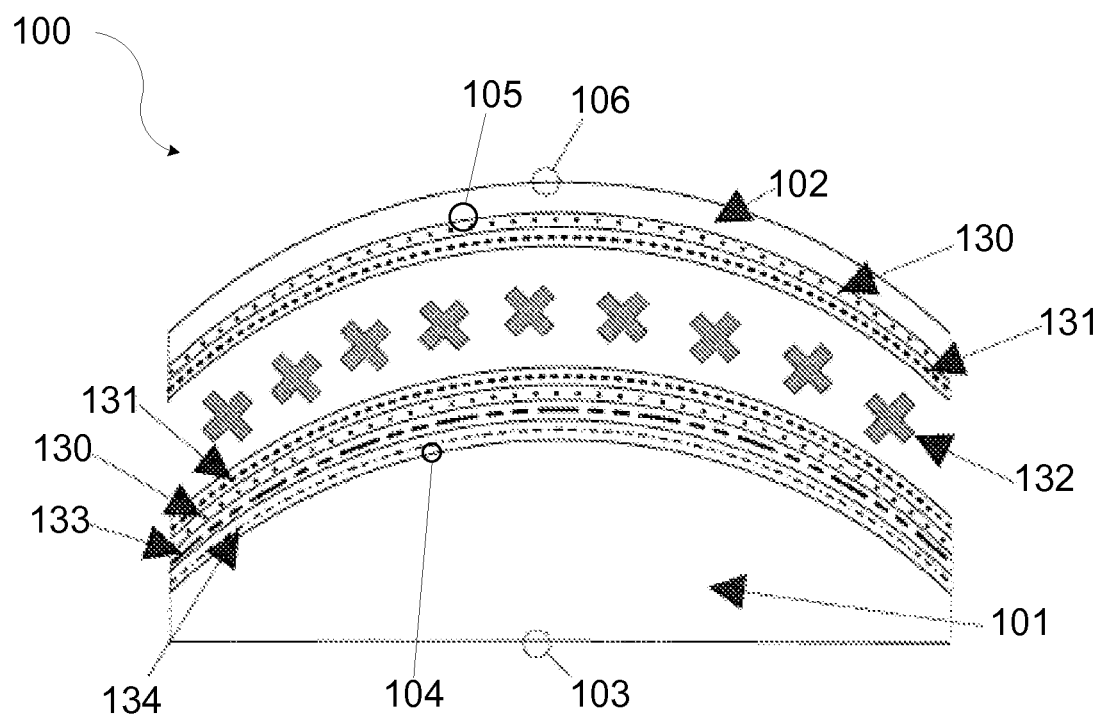
FIG. 3 shows a cross-sectional view of an exemplary electro-active lens in accordance with some embodiments.

With reference to FIG. 3, a cross-section of an exemplary electro-active lens 100 is shown comprising a first substrate (e.g. back substrate) 101 having a back surface 103 and front surface 104, a second substrate (e.g. front substrate) 102 having a back surface 105 and a front surface 106. The front surface 104 of the first substrate 101 is shown as being disposed opposite the back surface 105 of the second substrate 106. The exemplary electro-active lens is further shown as comprising electrodes 130, silicon dioxide (Si2) layers 131, an adhesive layer 132, and a hard coat layer 133 disposed between the front surface 104 of the first substrate 101 and the back surface 105 of the second substrate 102. Not shown in this example is an electro-active element that may be disposed between the electrodes 130. Insulating layers (such as $SiO_2$) may also be provided to prevent shorting across the electrodes 130. It should be noted that the elements of exemplary electro-active lens 100 are provided for illustration purposes only and some embodiments may comprise only some of these components or may comprise additional components, as would be understood by one of ordinary skill in the art.

Figure 4:
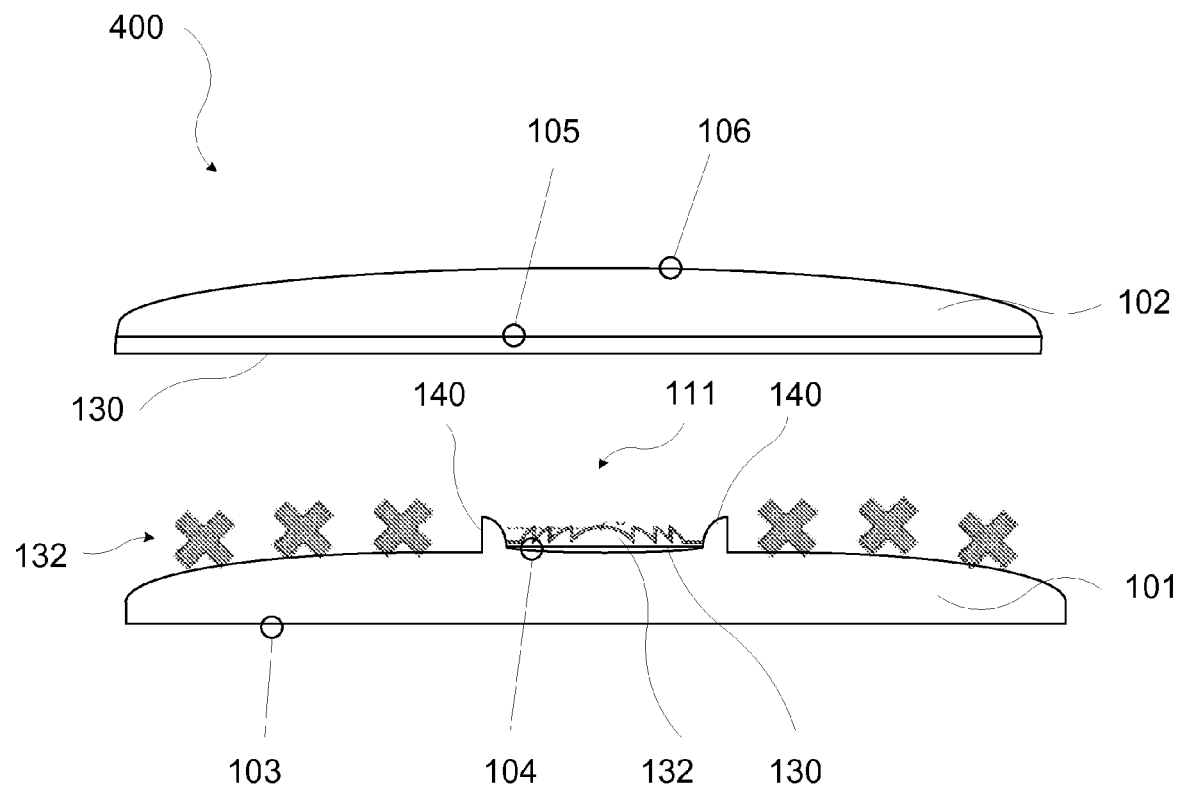
FIG. 4 shows a cross-sectional view of an exemplary electro-active lens comprising a surface relief diffractive structure.

FIG. 4 shows another cross-section of an exemplary electro-active lens 100, but includes additional detail with regard to an exemplary electro-active region 111. The electro-active lens 100 comprises a first substrate (e.g. back substrate) 101 having a back surface 103 and front surface 104, a second substrate (e.g. front substrate) 102 having a back surface 105 and a front surface 106. The front surface 104 of the first substrate 101 is shown as being disposed opposite the back surface 105 of the second substrate 102. The exemplary electro-active lens 100 further includes a patterned surface relief diffractive surface 132 that is disposed within a cavity that is formed by the features 140 of the first substrate 101. An electro-active element (not shown) may also be disposed within the cavity so as to cover the diffractive structure 132. It may be preferred, as described below, that the first substrate 101 and the electro-active element are index matched (i.e. that the index of refraction (and preferably the refractive index diversion) of each component are approximately the same) such that when the electro-active element is inactive, the features of the diffractive element may not affect light that passes through the region. When the electro-active element is activated (thereby changing the index of refraction of the material), light may be affected by the diffractive structure because of the difference in the index of refraction of the materials at the interface between the two components.

The exemplary electro-active lens 100 in FIG. 4 is further shown as comprising electrodes 130 for applying an electric field across the electro-active layer. Although the electrode 130 disposed on the back surface 105 of the second substrate 102 is shown as a blanket layer (i.e. covering the whole surface), embodiments are not so limited. Similarly, although the electrode 130 disposed on the front surface 104 of the first substrate 101 is shown as being disposed only within the cavity formed by features 140, embodiments are not so limited and the electrode 130 could also be a blanket layer. Moreover, in some embodiments, one or both electrodes 130 may be pixilated. The pixilated electrodes 130 may be provided instead of, or in addition to, the diffractive structure 132 so as to provide a desired optical power to the electro-active lens 100 (or the electro-active region 111 of the electro-active lens 100). An adhesive layer 132 is also shown as being disposed between the first substrate 101 and the second substrate 102. The adhesive layer 132 may couple the two substrates together.

Although the diffractive structure 132 is shown for illustration purposes as disposed on the first substrate 101 in FIG. 4, embodiments are not so limited. For example, the diffractive structure 132 may be disposed on the substrate 102 (e.g. on the back surface 105). Indeed, as described below, it may be preferred in some embodiments that the diffractive structure 132 is disposed on the front substrate 102 such as when the front substrate 102 comprises a glass material because, for instance, some glass materials may have a higher index of refraction at less cost than high index of refraction plastics.

Figure 5:
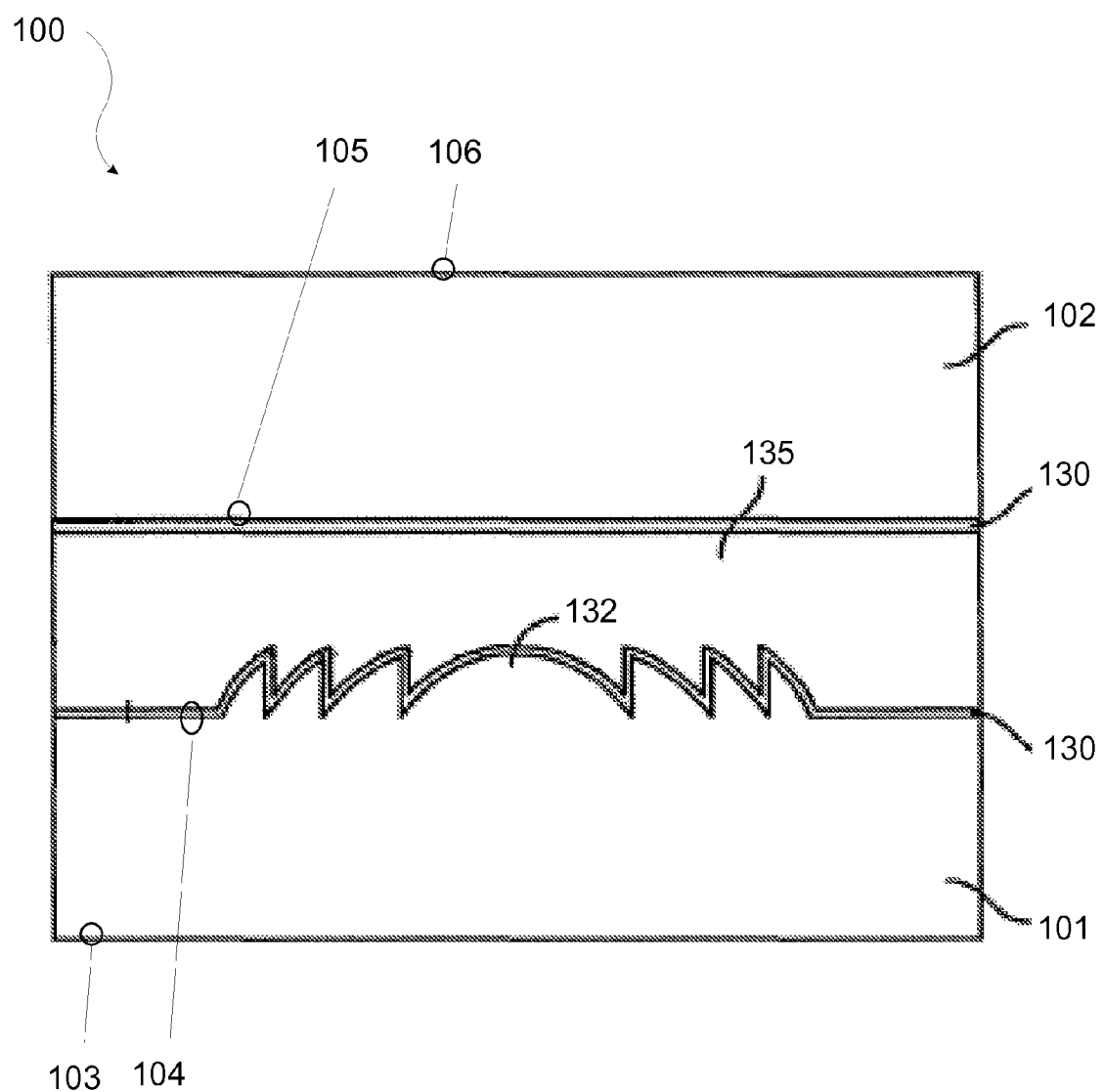
FIG. 5 shows a close-up of a cross-sectional view of an exemplary electro-active lens comprising a surface relief diffractive structure.

FIG. 5 shows a close-up of the cross-section of FIG. 4 of the cavity provided by the first substrate 101 in which the electro-active element 135 is disposed within. The exemplary electro-active lens 100 comprises a first substrate (e.g. back substrate) 101 having a back surface 103 and front surface 104, a second substrate (e.g. front substrate) 102 having a back surface 105 and a front surface 106. The front surface 104 of the first substrate 101 is shown as being disposed opposite the back surface 105 of the second substrate 106. The exemplary electro-active lens 100 further includes a patterned surface relief diffractive surface 132 that is disposed within a cavity that is formed by the features 140 (not shown in FIG. 5) of the first substrate 101. An electro-active element 135 may also be disposed within the cavity so as to cover the diffractive structure 132. The exemplary electro-active lens 100 is further shown as comprising electrodes 130 for applying an electric field across the electro-active layer 135.

With reference to the first exemplary embodiment (#1) noted above comprising a plastic substrate and a glass substrate, the electro-active lens 100 may comprise a thin glass front substrate 102 that has a front surface 106 having a finished plano or convex surface curvature and a back surface 105 having a concave back curvature that faces internally within the electronic lens 100. The thickness of the thin glass front substrate 102 may be, for example, 1.0 mm or less in thickness (and preferably 0.50 mm or less in thickness). In general, it may be preferred that the front substrate 102 comprising glass is thin to reduce the weigh of the lens 100.

With reference to subset "X," the diffractive element 132 or pixilated element 130 may be located on the front surface 104 of the back plastic substrate 101 (i.e. the surface that faces internally within the electronic lens 100). With this embodiment, the back external surface 103 of the back plastic substrate 101 may be finished or unfinished. When unfinished, it may be referred to as an electronic semi-finished lens blank. In most cases, the back external surface 103 of the back plastic substrate 101 may be unfinished so as to allow for machining (by way of example only, surfacing, polishing, and/or free forming or digitally surfacing) into the final required optical prescription (sphere, cylinder and/or combination of both) of the wearer/user. In addition, in some embodiments a low power or partial add power progressive addition surface may be generated when machining the final required prescription. Once the proper prescription is generated on the lens blank, the lens blank may be edged into the shape of the eyeglass frame it is to be mounted into (which may also expose one or more electrical contacts to the electrodes 130). The electro-active lens 100 may then be mounted into the frames.

The exemplary embodiments identified as subset "Z" of the first exemplary embodiment (#1) (i.e. an electro-active lens having a glass substrate and a plastic substrate) may comprise a similar configuration and components to the exemplary embodiment described with reference to subset "X" of the first exemplary embodiment (#1) described above, but that the diffractive 132 or pixilated 130 element may be disposed on the back surface 105 of the front glass substrate 102 as opposed to being located on the front surface 104 of the back plastic substrate 101. As was noted above, it is generally preferred that the substrate that comprises the diffractive 132 or pixilated 130 element have an index of refraction that matches the index of refraction of the liquid crystal layer 135 in the absence of electrical power (i.e. inactive state). This also ensures that the electronic lens 100 is optically fail-safe (i.e. if the electro-active element fails, the user will typically be provided with the optical power needed for far distance viewing). In general, each of the other features described above may be the same for embodiments in which the front substrate 102 comprises the diffractive element 132 or pixilated element 130 (i.e. subset "Z") as when the back substrate 101 comprises the diffractive element 132 or pixilated element 130 (i.e. subset "X").

By way of example only, in some embodiments, the back substrate 101 of the first exemplary embodiment may be made of high index 1.67 plastic material made by Mitusi®. The front substrate 102 may comprise a glass material of an appropriate thickness for a predefined optical power and feature(s) and have a back curvature 105 of the glass substrate 102 that closely mirrors the front curvature 104 of the back plastic substrate 101, although embodiments are not so limited.

Continuing with the first exemplary embodiment (#1) comprising a glass and a plastic substrate, certain coatings, as specified below, may be placed upon the back curvature surface of the front glass substrate 102 and also on the front curvature surface 104 of the back plastic substrate 101. In certain embodiments, but not all, an alignment layer (not shown) may be placed over the diffractive 132 or pixilated 130 element(s). A liquid crystal layer 135 (as shown in FIG. 5) may also be disposed (i.e. sandwiched) over the surface relieve diffractive element 132 or the pixilated element 130. The liquid crystal layer 135 located over the diffractive element 132 or the pixilated element 130 may be less than 10 microns of thickness and may be isolated so as to be located over one or the other of these elements. The liquid crystal layer 135 can be that of, by way of example only, nematic or cholesteric.

This isolation of liquid crystal layer 135 may be accomplished by way of a seal feature(s) (e.g. features 140) located around the diffractive 132 or pixilated 130 region(s). This seal feature(s) 140 may be formed, by way of example only, on the surface of the substrate comprising the diffractive 132 or pixilated region 130. Examples of seal features are described in more detail in U.S. Pat. Pub. No. 2009/0256977, filed on Mar. 23, 2009, which is incorporated herein by reference in its entirety. The diffractive region 132 may be formed, by way of example only, diamond turning, molding, casting, thermoforming, stamping, chemical etching, laser etching, or any other suitable method. If a pixilated region is utilized, it may be formed, by way of example only, using lithography or any suitable deposition technique.

In some embodiments, the thin front glass substrate 102 may be of a photochromatic glass or a clear glass. In some embodiments, a polarized film may be incorporated into the electronic lens as a separate layer (e.g. disposed on a surface of the front 102 or back 101 substrates). Also, in some embodiments the glass front outer plano or convex surface 106 of the first exemplary embodiment (e.g. electro-active lens comprising a plastic substrate and a glass substrate) may be anti-reflective (AR) coated. In addition, in some embodiments, the glass of the front substrate 102 may be that of tempered glass. In some embodiments, a cushion coat (or hard coated layer) 134 be optionally be provided as shown in FIG. 3. In some embodiments, if desired, the glass front surface 106 may be provided in such a form and curvature to create an achromatic doublet lens to reduce chromatic aberration.

A second exemplary embodiment (#2) will also be described in which the front 102 and back 101 substrates may comprise a plastic material (but different plastic materials). As noted above, embodiments are not so limited, and the second exemplary embodiment (#2) is provided for illustration purposes only. The features of the second exemplary embodiment are similar to those described above with reference to the first exemplary embodiment (#1), and reference will again be made to the electro-active lens 100 shown in FIGS. 1-5.

The second exemplary embodiment (#2) may comprise a thin plastic front substrate 102 having a front finished plano or convex surface curvature 106 and a concave back curvature 105 that faces internally within the electronic lens 100. The thickness of the thin plastic front substrate 102 may be, for example, 1.5 mm or less (and preferably 1.0 mm or less in thickness). With the subset "X" of the second exemplary embodiment (i.e. where the diffractive or pixilated element may be disposed on the back substrate 101), the diffractive element 132 or pixilated element (i.e. pixilated electrode(s)) 130 may be located on the front surface 104 of the back plastic substrate 101, which faces internally within the electronic lens 100. With this embodiment, the back external surface 103 of the back plastic substrate 101 can be finished or unfinished. When unfinished, it may be referred to as an electronic semi-finished lens blank. In many cases, the back external surface 103 of the back plastic substrate 101 may be unfinished such to allow for machining (by way of example only, surfacing, polishing, and/or free forming or digitally surfacing) into the final predetermined optical prescription (sphere, cylinder and/or a combination of both) of the wearer/user. In addition, in certain embodiments, a low power or partial add power progressive addition surface may be generated when machining the final required prescription (i.e. predetermined optical power). Once the proper prescription is generated on the lens blank 101, the lens blank may be edged into the shape of the eyeglass frame it is to be mounted into and may then be mounted.

With continued reference to the second exemplary embodiment (#2), the subset "Z" (comprising the diffractive element or pixilated element on the front substrate 102) is similar to the subset "X" described above, but the diffractive 132 or pixilated 130 element is located on the back surface 105 of the front plastic substrate 102 as opposed to being located on the front surface 104 of the back plastic substrate 101. As was noted above, it is generally preferred that the substrate that comprises the diffractive 132 or pixilated 130 element have an index of refraction that matches the index of refraction of the liquid crystal layer 135 in the absence of electrical power (i.e. in the inactive state). This also provides that the electronic lens 100 may be optically fail safe. The other features of the subset "Z" of the second exemplary embodiment (#2) may be the same or similar to subset "X" of the second exemplary embodiment (#2) (i.e. embodiments in which the front 102 and back 101 substrates comprise a plastic material).

Continuing with reference to the second exemplary embodiment, and by way of example only, the back substrate 101 (for either subset "X" or subset "Z" described above), may comprise a high index 1.67 material made by Mitusi®. The front substrate 102 may comprise a plastic of a desired thickness having a back curvature 105 that closely mirrors the front curvature 104 of the back plastic substrate 101 (or may have any suitable shape so as to provide a predefined optical feature(s)). The thin plastic front substrate 102 can be made of, by way of example only, polycarbonate or nylon. In certain embodiments, but not all, an alignment layer may be placed over the diffractive 132 or pixilated 130 element(s). A liquid crystal layer 135 may also be disposed (i.e. sandwiched) over the surface relief diffractive element 132 or the pixilated element 130. The liquid crystal layer 135 may be located over the diffractive element 132 or the pixilated element 130 and may, for example, be less than 10 microns of thickness. The liquid crystal layer and may be isolated such that it is located only over one or the other of these elements. The liquid crystal layer 135 can be that of, by way of example only, nematic or cholesteric.

This isolation of the liquid crystal layer 135 may be accomplished by way of example only, a seal feature (e.g. features 140) located around the diffractive or pixilated region 111. This seal feature(s) 140 may be formed, by way of example only, on the surface of the substrate comprising the diffractive 132 or pixilated 130 region(s). The diffractive region 132 may be formed, by way of example only, diamond turning, molding, casting, thermoforming, stamping, chemical etching, or laser etching. If a pixilated region (e.g. electrodes 130 are pixilated) is utilized, it may be formed, by way of example only, lithography or any suitable deposition process. The thin front plastic substrate 102 may comprise a photochromatic plastic or a clear plastic. In some embodiments, a polarized film may be incorporated into the electronic lens 100 as a separate layer. In some embodiments, the front outer plano or convex surface 106 of the front substrate 102 of the second exemplary embodiment may comprise an AR coating.

In general, the embodiments provided herein may provide for the some of the advantages associated with different lens materials to be utilized in a single lens. For example, glass material may be the hardest lens material and typically offers the best protection against scratches. Moreover, glass lenses provide excellent optics, the most scratch resistant lens, and typically block UV light. However, glass lenses are often heavier than plastic lenses. The inventors have thereby found that embodiments in which a thin substrate of the electro-active lens comprises glass (preferably the front substrate to take advantage of the scratch resistant features) may be utilized to provide the advantages of glass material without overly increasing the weight of the lens. This may then be combined with a plastic substrate (which are typically lighter, more expensive—at least for higher indexes of refraction—and easier to shape and fabricate), which may form the back substrate such that the back substrate may be more readily machineable so as to be finished to provide a predefined optical power for the user, while keeping the weight of the lenses at a reasonable value. Other advantages may also be realized through the use of various combinations of materials.

For instance, for the first exemplary embodiment (#1) described above (e.g. comprising a glass front substrate 102 and a plastic back substrate 101), the combination of materials may allow for a thinner ophthalmic electronic lens 100 because glass materials typically have a higher index of refraction than plastic at less cost. Other advantages associated with glass lenses may include higher scratch resistance (glass lenses typically do not require scratch-resistant coatings for added durability), lower manufacturing costs, higher manufacturing yields, lower cost of goods, a less expensive photochromatic electronic lens, and allows for the electronic lens to be provided to the consumer in multiple materials. The second exemplary embodiment described above (#2) comprising two different plastic materials for the substrate may provide similar advantages as those described above for the first exemplary embodiment (#1) such as allowing for a thinner ophthalmic electronic lens, lower manufacturing costs, higher manufacturing yields, lower cost of goods, a less expensive photochromatic electronic lens, and may allow the electronic lens to be provided to the consumer in multiple materials because different plastic materials may be chosen for an intended purpose.

Exemplary Embodiments

Described below are exemplary embodiments of electro-active lenses, and devices that comprise electro-active lenses, that include two substrates that comprise a different material (such as a glass materials and a plastic material or two different plastic materials). The embodiments described herein are for illustration purposes only and are not thereby intended to be limiting. After reading this disclosure, it may be apparent to a person of ordinary skill in the art that various components and/or features as described below may be combined or omitted in certain embodiments, while still practicing the principles described herein.

Some embodiments may provide an electro-active lens. The electro-active lens may comprise a first substrate, a second substrate, and an electro-active element disposed between the first substrate and the second substrate. The electro-active element may be configured to alter the optical power of at least a portion of the electro-active lens. The first substrate may comprise a different material than the second substrate.

As used herein, a "substrate" is a component that is generally well-known in the field of optics. A substrate typically refers to the component of a lens that is first fabricated or provided, and on which additional layers or materials may be deposited. A substrate may have dimensions on the order of millimeters or fractions of millimeters, whereas coatings and other deposited layers on the substrate typically have dimensions (i.e. thicknesses) that are on the order of microns.

The use of the term "different material" may refer to when the first substrate and the second substrate comprise materials that have different physical, chemical, and/or optical properties based on their material composition. For instance, the first substrate could comprise glass and the second substrate could comprise a plastic material. However, embodiments are not so limited. In some embodiments, the first and the second substrate could comprise different types of plastic materials. For example, the plastic material of the first substrate may have different properties such as: index of refraction, density, hardness, tensile strength, flexural strength, elastic modulus, thermal stability, etc. than the second substrate. This may result in the first and the second substrates having different costs, different manufacturability, different weights, different thicknesses, etc. In general, the materials may be chosen based on the particular purpose or application the electro-active lens, the other materials that comprise the electro-active lens, or any other suitable consideration.

In general, the inventors have found that in some instances, there may not be a single material that provides both the desired optical properties and the structural properties that would be ideal for both substrates to comprise in the electro-active lens. Rather than using the same material that may have one or more characteristics that are less than ideal (or that could increase the costs of the lens, such as the use of a high index plastic) for each substrate, the inventors have unexpectedly found that two different materials may be utilized for each substrate, where each of the materials may have a desired property or properties. The two substrates can thereby be combined into a single composite electro-active lens, which will possess the attributes of both materials. For example, the first substrate may be chosen so as to have certain optical properties that are desirable for the electro-active lens (such as by having an index of refraction that corresponds to the index of refraction of the electro-active element), while the second substrate may be chosen based on its cost or its physical or structural properties (e.g. the material may be better suited for manufacture, comprise a less expensive material, provide greater structural support for the lens or a higher resistance to scratching, or any other feature or features).

In some embodiments, in the electro-active lens as described above, the first substrate may have a front surface and a back surface, the second substrate may have a front surface and a back surface, the front surface of the first substrate and the back surface of the second substrate may define a first cavity; and the electro-active element is disposed within the first cavity. Such embodiments are particularly illustrated in FIGS. 4 and 5 and described above. As noted above, the substrate material(s) may be chosen such that one or both of the substrates may be readily fabricated so as to create a cavity (and/or a diffractive structure) for the electro-active element, and also so as to utilize the properties of the electro-active material to provide a desired optical feature or features (e.g. to index match the materials of one or both of the substrates).

In some embodiments, the electro-active lens as described above may further comprise an adhesive layer that is disposed between the first substrate and the second substrate, where the first substrate and the second substrate are coupled together by the adhesive layer. In this regard, the inventors have found that coupling and utilizing substrates that comprise different materials for electro-active lenses may present problems with regard to maintaining the coupling despite the forces that are consistently applied to eyewear, including physical forces (such as being dropped, slept on, being removed and placed on the head, etc.) as well as environmental forces such as differential thermal expansion and contraction cycling based on the different thermal expansion properties of the two materials. Therefore, the inventors have found that it is preferred that adhesives utilized in some such embodiments comprise a material that has sufficient elasticity to provide the flexibility to absorb these forces and to expand and contract as needed while still maintaining the coupling bond to each of the substrates. An exemplary adhesive that the inventors have discovered is suitable for such embodiments of hybrid lenses is disclosed in U.S. application Ser. No. 13/045,961, filed Mar. 11, 2011, which is incorporated by reference herein in its entirety.

In addition and with regard to the above, in some embodiments, the adhesive layer may be a visco-elastic material and have a glass transition temperature in the range of 0-20° C. In some embodiments, the adhesive layer may comprise any one of, or some combination of, the following: urethane prepolymers, thio-urethane prepolymers, vinyl resins, thiols, allylic or vinyl phenols, acrylic monomers and oligomers, photoinitiators, stabilizers and inhibitors, naphthalene compounds, or silanes. In general, in addition to the selection of an adhesive with the physical properties desired to withstand some of the forces mentioned above while maintaining the coupling between the two substrates comprising different materials, the adhesive may also be chosen (in part) based on its optical properties as well (such as its index of refraction).

In some embodiments, in the electro-active lens as described above comprising an adhesive layer, the adhesive may comprise silane, the first substrate may comprise MR 10 plastic, and the second substrate may comprise a glass such as tempered glass or transparent glass. In some embodiments, the first and second substrates may comprise any of the following materials pairs (listed in the following manner: first substrate material/second substrate material):

MR8/glass
MR7/glass
Polycarbonate/glass
Acrylate/glass
Trivex/glass
PSU/glass
PPSU/glass In some embodiments, in the electro-active lens as described above, the first substrate may have an index of refraction that is different than the index of refraction of the second substrate. As noted above, it was previously believed that matching the index of refraction of the substrates to each other and to the electro-active material was the predominant consideration in selecting materials for the electro-active lens. However, as described in detail above, the inventors have found unexpectedly that additional benefits may be provided by using substrates comprising different materials. While this may result in refractive indices that vary across the layers (although embodiments are not so limited), the effects may be reduced within the lens (e.g. by shaping one or more of the surfaces), by adjusting a diffractive structure, by utilizing one or more coatings, etc. In some embodiments, the first substrate may have an index of refraction that is at least 10% different than the index of refraction of the second substrate. In some embodiments, the first substrate may have an index of refraction that is at least 30% different than the index of refraction of the second substrate. However, embodiments are not so limited, and in some instances as noted above, the substrates may comprise different materials but comprise the same (or approximately the same) refractive index (such as when comprising a high index plastic with glass). This may be preferred in some instances because such embodiments may provide some of the advantages of using a hybrid material design without (or with minimum) optical effects from the difference in the index of refractions of those materials.

In some embodiments, in the electro-active lens as described above, the first substrate may have a coefficient of thermal expansion that is at least approximately 10% different than the coefficient of thermal expansion of the second substrate. In some embodiments, the first substrate may have a coefficient of thermal expansion that is at least approximately 15% different than the coefficient of thermal expansion of the second substrate. In some embodiments, the first substrate may have a coefficient of thermal expansion that is at least approximately 20% different than the coefficient of thermal expansion of the second substrate. As noted above, one of the problems the inventors discovered with regard to the use of composite materials may be the difference in thermal cycling (i.e. different materials expand and contract to different lengths based on changing temperatures). This difference in expansion and contraction results in the distances between the substrates increasing or decreasing, thereby applying forces to the adhesive that couples the substrates together. Thus, the inventors have identified certain materials (noted above) for the adhesive layer that may have sufficient elasticity to maintain the connection between the substrates even through many cycles of thermal expansion. In this manner, the inventors have discovered exemplary methods provided for the use of hybrid electro-active lenses. In this regard, in some embodiments, in the electro-active lens as described above, the first substrate has a coefficient of linear thermal expansion between approximately $5\times10^{-5}$ and $7\times10^{-5}/°$ C., and wherein the second substrate has a coefficient of linear thermal expansion between approximately $7\times10^{-5}$ and $9\times10^{-5}/°$ C. That is, the first substrate may have a lower coefficient of linear thermal expansion than the second substrate (or vice versa).

In some embodiments, in the electro-active lens as described above, the first substrate may have a flexural strength that is at least approximately 10% different than the flexural strength of the second substrate. In some embodiments, the first substrate may have a flexural strength that is at least approximately 30% different than the flexural strength of the second substrate. In some embodiments, the first substrate may have a flexural strength that is at least approximately 50% different than the flexural strength of the second substrate. In some embodiments, the first substrate has a flexural strength between approximately 10,000 and 15,000 PSI, and wherein the second substrate has a flexural strength between approximately 15,000 and 20,000 PSI. That is, for instance, one of the substrates may be chosen so as to provide greater structural support for the electro-active lens (or a portion thereof) than the other substrate, which may thereby be used to off-set a lack of flexural strength or structural support provided by the different martial. The weaker material, for example, may provide other properties that may be advantageous for use in combination with the stronger material (such as decreased cost, weight, increased optical properties, etc.).

In some embodiments, in the electro-active lens as described above, the first substrate may have a coefficient of linear thermal expansion between approximately $5\times10^{-5}$ and $7\times10^{-5}/°$ C., the second substrate may have a coefficient of linear thermal expansion between approximately $7\times10^{-5}$ and $9\times10^{-5}/°$ C., the first substrate may have a flexural strength between approximately 10,000 and 15,000 PSI, and the second substrate may have a flexural strength between 15,000 and 20,000 PSI. That is, different material properties may be chosen so to compensate for the deficiencies of each material (e.g. the materials may be complementary in many respects).

In addition to the properties mentioned above, other material properties of interest when selecting materials for the first and second substrate may include, by way of example only, transparency, yellow index, percent of haze, flexibility/Young's modulus of elasticity, toughness/impact strength, glass transition temperature, etc.

In some embodiments, the electro-active lens as described may further comprise a diffractive element or a pixilated element. As described above, a "diffractive element" may refer to a diffractive pattern that may be disposed on the surface of a substrate such as, by way of example only, etching, grinding or molding the surface. Such an optic may comprise a physical structure which is patterned to have a fixed optical power and/or aberration correction, by way of a surface relief diffractive topological profile. In some embodiments, the electro-active element may overlay the surface relief diffractive topographical profile. As described above, a "pixilated element" may comprise a plurality of individually addressable electrodes such that each electrode may be activated (or not activated) separately from anyone of, or some group of, the other electrodes. These elements may be utilized to provide a predefined optical power(s) (e.g. an add power) to a region(s) of the electro-active lens based on the amount of current or voltage applied to the element.

In some embodiments, in the electro-active lens as described above, the first substrate may comprise a plastic material and the second substrate may comprise glass. As was noted above, conventional understanding was that the substrates of an electro-active lens should comprise the same material because of the potential negative optical implications of different materials as well as the effect that different materials could have on the structure of the lens. For example, the differences in the thermal properties of the substrates could result in different rates of thermal expansions when experiencing the same change in temperature. This difference in thermal expansion between the substrates could result in the separations between components (and thereby breaking any seals that were formed) or it could create pressure between the substrates and potentially damage the electronics or the electro-active material of the lens. However, the inventors have found that, through the use of flexible adhesive (such as urethanes, thio-urethanes, acrylates, and so on), that a hybrid substrate electro-active lens that is commercially viable could be fabricated.

In some embodiments, in the electro-active lens as described above where the first substrate comprises a plastic material and the second substrate comprises glass, the first substrate that comprises plastic may comprise any one of: MR10, MR8, MR7, polycarbonate, Trivex, CR39, PSU, PPSU, or acrylate. In some embodiments, the second substrate that comprises glass comprises any one of: variety of glasses including tempered glass, tinted or clear glass, photochromic glass, etc.

In some embodiments, in the electro-active lens as described above where the first substrate comprises a plastic material and the second substrate comprises glass, the first substrate that comprises plastic may comprise a MR-series material.

In some embodiments, in the electro-active lens as described above where the first substrate comprises a plastic material and the second substrate comprises glass, the first substrate may have a front surface and a back surface, the second substrate may have a front surface and a back surface, and the front surface of the first substrate may be disposed opposite to the back surface of the second substrate. As used in this context, the term "opposite to" is intended to describe a configuration in which the "opposite" surfaces of the substrates correspond to the surfaces of the substrates that are in the closest proximity to one another. This is illustrated, for example in FIGS. 1 and 3-5, where surface 104 of substrate 101 may be considered "opposite to surface 105 of substrate 102. However, this does not imply that the surfaces that are "opposite" are also adjacent to or otherwise in physical contact. That is, there may be a plurality of layers disposed between some or all of the portions of the two surfaces of the substrates, such as one or more electrodes, an electro-active alignment layer, an electro active layer, etc. In some embodiments, the "opposite" surfaces may also be parallel or substantially parallel, however, embodiments are not so limited.

In this exemplary embodiment described above, the first substrate that comprises plastic may be located closest to the wearer when the lens is in use and the second substrate that comprises glass may be disposed farther away from the wearer's face when the lens is in use. This configuration may, in some instances, provide the advantage of utilizing the scratch resistant nature of glass, while also taking advantage of the machinability of the plastic substrate to be finished.

Figure 6:
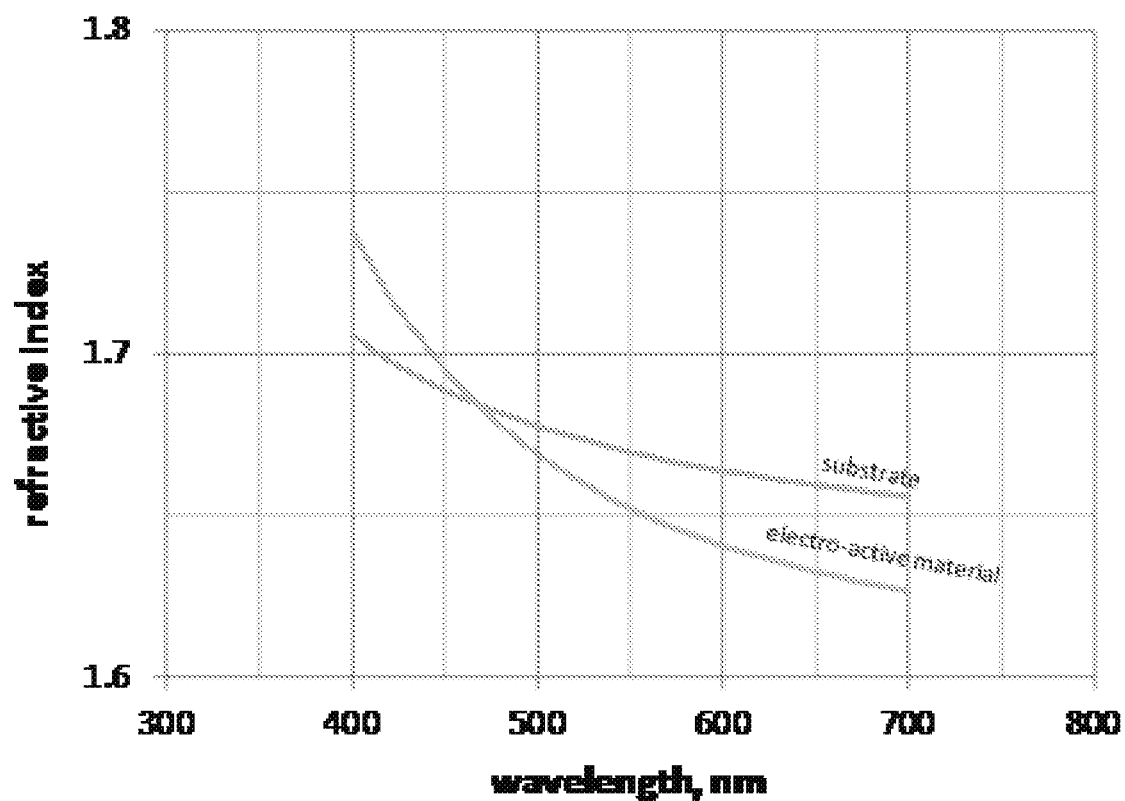
FIG. 6 is a plot of the refractive index vs. wavelength (nm) of an exemplary substrate and exemplary electro-active material to illustrate the refractive index divergence.

In some embodiments, the front surface of the first substrate may comprise a diffractive element or a pixilated element. In some embodiments, the first substrate may have an index of refraction and refractive index (RI) dispersion that match the index of refraction and refractive index dispersion of the electro-active element when in an inactive state. An example of RI-dispersions for an exemplary substrate material and an electro-active element is shown in FIG. 6. As shown, the difference in the dispersion between the electro-active material and the substrate may vary the difference in the index of refraction based on the wavelength of light, where the "dispersion" is a measure of the change of the refractive index with wavelength. As used in this context, "match" may refer to when the indexes of refraction are within 2% (preferably within 1%) over the visible spectrum (e.g. from 400 nm to about 700 nm).

As used in this context and described above, the "inactive state" of the electro-active element may refer to when an electric field is not applied across the element (e.g. when "the electric power is turned off.").

In some embodiments, the first substrate may have an index of refraction that is within approximately 10% of the index of refraction of the electro-active element when in an inactive state.

In some embodiments, in the electro-active lens as described above, where the first substrate comprises a plastic material and the front surface of the first substrate comprises a diffractive element or a pixilated element, the first substrate has an index of refraction of approximately 1.67. Many electro-active elements (such as liquid crystal layers) have an index of refraction that is at or near 1.67, and therefore it may be preferred that one (or both) of the substrate materials have the same or similar index of refraction.

In some embodiments, in the electro-active lens as described above, where the first substrate comprises a plastic material and the front surface of the first substrate comprises a diffractive element or a pixilated element, the first substrate may have a thickness that is less than approximately 1.5 mm. This typically corresponds to a thickness for a finished lens blank (e.g. one that has been machined to match an ophthalmic prescription of a user). Unfinished lens blanks may have a thickness of, for instance 3.0 mm or more.

In some embodiments, in the electro-active lens as described above, where the first substrate comprises a plastic material, the back surface of the second substrate may include a diffractive element or a pixilated element. In some embodiments, the second substrate may have an index of refraction that is approximately equal to the index of refraction of the electro-active element when the electro-active element is in an inactive state. In some embodiments, the second substrate may have an index of refraction that is within approximately 10% of the index of refraction of the electro-active element when in an inactive state. In some embodiments, the second substrate may have an index of refraction of approximately 1.67.

In some embodiments, in the electro-active lens as described above, where the first substrate comprises a plastic material and the second substrate comprises a glass material, the second substrate may have a thickness that is less than approximately 1.5 mm. In some embodiments, the second substrate may have a thickness that is less than approximately 1.0 mm. In some embodiments, the second substrate may have a thickness that is less than approximately 0.5 mm. As noted above, it may be preferred in some embodiments that the glass substrate may have a small relative thickness to reduce the weight of the electro-active lens. Moreover, glass material typically provides strong structural support, and may thereby be thinner without compromising the structural integrity of the electro-active lens.

However, embodiments are not so limited, and in general the thicknesses of the first substrate and the second substrate may be selected based on the composition of the materials (and their relevant properties), as well as the application that the lens is intended to be used in. Thus, in some embodiments, in the electro-active lens as described above, where the first substrate comprises a plastic material and the second substrate comprises a glass material, the second substrate may have a thickness that is greater than the thickness of the first substrate. In some embodiments, the second substrate may have a thickness that is less than the thickness of the first substrate. In some embodiments, the second substrate has a thickness that is approximately equal to the thickness of the first substrate. In some embodiments, in the electro-active lens as described above, where the first substrate comprises a plastic material and the second substrate comprises a glass material, the first substrate may have a thickness that is between approximately 1.0 mm and 3.0 mm and wherein the second substrate has a thickness between approximately 0.3 and 1.0 mm.

In some embodiments, in the electro-active lens as described above, where the first substrate comprises a plastic material and the second substrate comprises a glass material, the first substrate comprises a semi-finished lens blank. In some embodiments, the first substrate may be configured to be edged, grinded, or polished. In general, the plastic substrate may be chosen so as to comprise a material that may be readily finished because glass materials, in some instances, may be difficult to finish.

In some embodiments, in the electro-active lens as described above, where the first substrate comprises a plastic material and the second substrate comprises a glass material, the first substrate may have a progressive addition surface. In some embodiments, the progressive addition surface may be disposed on the back surface of the first substrate. The progressive addition surface may be used to provide the near distance viewing optical power of the wearer. It may be provided on the back surface of the plastic substrate because this may be the easiest surface to finish to the prescription needs of the user. The electro-active region of the lens may be in optical communication with some, or all, of the progressive addition surface so that, when activated, the full add power of the user's prescription is provided.

In some embodiments, in the electro-active lens as described above, where the first substrate comprises a plastic material and the second substrate comprises a glass material, the second substrate may be photochromatic. In general, a glass substrate may be more readily photochromatic than a plastic substrate (which be warped or deformed in the process, as was noted above).

In some embodiments, in the electro-active lens as described above, where the first substrate comprises a plastic material and the second substrate comprises a glass material, the electro-active lens may further comprise an anti-reflective layer disposed on the front surface of the second substrate.

In some embodiments, in the electro-active lens as described above, the first substrate may comprise a first plastic material and the second substrate may comprise a second plastic material, where the first plastic material and the second plastic material are different. Such embodiments may, for instance correspond to the second exemplary embodiment (#2) described above.

In some embodiments, in the electro-active lens as described above where the first substrate comprises a first plastic material and the second substrate comprises a second plastic material, the first substrate and the second substrate may comprise any one of: MR10, MR8, MR7, polycarbonate, Trivex, CR39, PSU, PPSU, or acrylate. However, any suitable material may be selected for use as the first and second substrate, and each substrate may be selected not only based on its own characteristics, but also the combination of characteristics with another substrate.

In some embodiments, in the electro-active lens as described above where the first substrate comprises a first plastic material and the second substrate comprises a second plastic material, the first substrate may comprises Trivex and the second substrate may comprise CR39. That is, for example, a more expensive and better performing plastic may be chosen for one of the substrates, and a more readily available (and less expensive) substrate may be chosen for the other substrate, such that the user receives the potential for reduced cost but increased optical features of the combined materials. In some embodiments, the first substrate may comprise MR10 and the second substrate may comprise polycarbonate. In some embodiments, the first substrate may comprise MR10 and the second substrate may comprise MR8. As noted above, although embodiments are not so limited, the inventors have found that these combination of materials may be preferred for use in combination in an electro-active lens.

In some embodiments, in the electro-active lens as described above where the first substrate comprises a first plastic material and the second substrate comprises a second plastic material, the first substrate may have a front surface and a back surface, the second substrate may have a front surface and a back surface, and the front surface of the first substrate may be disposed opposite to the back surface of the second substrate. Examples of such embodiments are shown in FIGS. 1-5 and described above.

In some embodiments, in the electro-active lens as described above where the first substrate comprises a first plastic material and the second substrate comprises a second plastic material, the front surface of the first substrate may comprise a diffractive element or a pixilated element. This is shown, for example, in FIGS. 4-5 and described above. In some embodiments, first substrate may have an index of refraction that is approximately equal to the index of refraction of the electro-active element when in an inactive state. As noted above, it may be preferred that the index of refraction of the substrate that comprises the diffractive or pixilated structure match the index of refraction of a liquid crystal material such that the optical properties of these features may be masked when in an inactive state.

In some embodiments, in the electro-active lens as described above where the first substrate comprises a first plastic material, the second substrate comprises a second plastic material, and the front surface of the first substrate comprises a diffractive element or a pixilated element, the first substrate may have an index of refraction that is within approximately 10% of the index of refraction of the electro-active element when the electro-active element is in an inactive state.

In some embodiments, in the electro-active lens as described above where the first substrate comprises a first plastic material, the second substrate comprises a second plastic material, and the front surface of the first substrate comprises a diffractive element or a pixilated element, the first substrate may have an index of refraction of approximately 1.67.

In some embodiments, in the electro-active lens as described above where the first substrate comprises a first plastic material, the second substrate comprises a second plastic material, and the front surface of the first substrate comprises a diffractive element or a pixilated element, the first substrate may have a thickness that is less than approximately 1.5 mm Again, this may correspond to a finished lens blank that has been fabricated so as to have a structure that provides a predefined optical feature of a user.

In some embodiments, in the electro-active lens as described above where the first substrate comprises a first plastic material and the second substrate comprises a second plastic material, the back surface of the second substrate may comprise a diffractive element or a pixilated element. As was noted above, embodiments may provide any suitable optical feature in any location, including on the front surface of the back substrate or the back surface of the front substrate. Each of these example surfaces may be disposed interior to the electro-active lens, and thereby an electro-active element may be disposed over the features.

In some embodiments, in the electro-active lens as described above where the first substrate comprises a first plastic material, the second substrate comprises a second plastic material, and the back surface of the second substrate comprises a diffractive element or a pixilated element, second substrate may have an index of refraction that is approximately equal to the index of refraction of the electro-active element when in an inactive state.

In some embodiments, in the electro-active lens as described above where the first substrate comprises a first plastic material, the second substrate comprises a second plastic material, and the back surface of the second substrate comprises a diffractive element or a pixilated element, the second substrate may have an index of refraction that is within approximately 10% of the index of refraction of the electro-active element when the electro-active element is in an inactive state.

In some embodiments, in the electro-active lens as described above where the first substrate comprises a first plastic material, the second substrate comprises a second plastic material, and the back surface of the second substrate comprises a diffractive element or a pixilated element, the second substrate may have an index of refraction of approximately 1.67.

In some embodiments, in the electro-active lens as described above where the first substrate comprises a first plastic material, the second substrate comprises a second plastic material, and the back surface of the second substrate comprises a diffractive element or a pixilated element, the second substrate may have a thickness that is less than approximately 1.0 mm. In some embodiments, the second substrate may have a thickness that is less than approximately 0.5 mm. The front substrate may, in some instance, be thinner than the back substrate because the back substrate may be configured to be finished. Therefore, the front substrate may be chosen of a material that may be structurally more rigid (and may thereby be made thinner), but that may not be readily machineable because the back substrate may be finished to correspond to each user's needed prescription.

However, as noted above, embodiments are not so limited, and each of the first and second substrates may have any suitable thickness. In this regard, in some embodiments, in the electro-active lens as described above where the first substrate comprises a first plastic material and the second substrate comprises a second plastic material, the second substrate may have a thickness that is greater than the thickness of the first substrate. In some embodiments, the second substrate may have a thickness that is less than the thickness of the first substrate. In some embodiments, the second substrate may have a thickness that is approximately equal to the thickness of the first substrate. For example in some embodiments, in the electro-active lens as described above where the first substrate comprises a first plastic material, the second substrate comprises a second plastic material, the first substrate may have a thickness that is between approximately 0.3 mm and 0.7 mm and the second substrate may have a thickness that is between approximately 0.5 mm and 2.5 mm.

In some embodiments, in the electro-active lens as described above where the first substrate comprises a first plastic material and the second substrate comprises a second plastic material, the first substrate may comprise a semi-finished lens blank. In some embodiments, the first substrate may comprise a progressive addition surface. In some embodiments, the progressive addition surface may be disposed on the back surface of the first substrate.

In some embodiments, in the electro-active lens as described above where the first substrate comprises a first plastic material and the second substrate comprises a second plastic material, the second substrate may be photochromatic.

In some embodiments, in the electro-active lens as described above where the first substrate comprises a first plastic material and the second substrate comprises a second plastic material, the second substrate the second substrate may comprise polycarbonate or nylon.

In some embodiments, an electronic lens capable of a change of focus may be provided. The lens may be comprised of two substrates, where the front substrate furthest away from the eye of the wearer is made of glass, and where the back substrate closest to the eye of the wearer is made of plastic.

In some embodiments, the lens as described above may comprise front substrate that has a back surface curvature that is internal to the electronic lens, where said back surface curvature comprises a diffractive element.

In some embodiments, the lens as described above may comprise a front substrate that has a back surface curvature that is internal to the electronic lens and whereby said back surface curvature comprises a pixilated element.

In some embodiments, in the lens as described above, the glass is 1.67 index glass in some embodiments, the glass is photochromatic. In some embodiments, the glass has a thickness of 1.0 mm or less. In some embodiments, the glass has a thickness of 0.50 mm or less.

In some embodiments, in the lens as described above, the front substrate has a back surface curvature that is internal to the electronic lens and where said back surface curvature is spherical.

In some embodiments, an electronic lens capable of a change of focus may be provided, where the lens is comprised of two substrates, where the front substrate furthest away from the eye of the wearer is made of a plastic material, and where the back substrate closest to the eye of the wearer is made of plastic material different from the front substrate.

In some embodiments, in the lens as described above, the front substrate may have a back surface curvature that is internal to the electronic lens, where the back surface curvature comprises a diffractive element.

In some embodiments, in the lens as described above, the front substrate may have a back surface curvature that is internal to the electronic lens and comprises a pixilated element.

In some embodiments, in the lens as described above, the front substrate may be made of polycarbonate. In some embodiments, the front substrate may be made of nylon. In some embodiments, the front substrate may be photochromatic.

In some embodiments, a first device may be provided that comprises any of the exemplary electro-active lenses described above. Such devices may include, by way of example only, eyewear such as spectacles, eyeglasses, and non-prescription glasses. In some embodiments the first device may comprise a power source, a controller, and sensors, where the power source and/or the controller may be electrically coupled to the electro-active element(s) of the electro-active lens.

CONCLUSION

It is understood that the various embodiments described herein are by way of example only, and are not intended to limit the scope of the invention. For example, many of the materials and structures described herein may be substituted with other materials and structures without deviating from the spirit of the invention. The present invention as claimed may therefore include variations from the particular examples and preferred embodiments described herein, as will be apparent to one of skill in the art. It is understood that various theories as to why the invention works are not intended to be limiting.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

Although many embodiments were described above as comprising different features and/or combination of features, a person of ordinary skill in the art after reading this disclosure may understand that in some instances, one or more of these components could be combined with any of the components or features described above. That is, one or more features from any embodiment can be combined with one or more features of any other embodiment without departing from the scope of the invention.

As noted previously, all measurements, dimensions, and materials provided herein within the specification or within the figures are by way of example only.

A recitation of "a," "an," or "the" is intended to mean "one or more" unless specifically indicated to the contrary.

As used herein, reference to a "first" or a "second" does not limit the referenced component to a particular location unless expressly stated. For instance, reference to a "first temple" may comprise the temple located on either the left side or the right side of a wearer's head.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

What is claimed is:

1. An electro-active lens, comprising:
   a first substrate;
   a second substrate; and
   an electro-active element disposed between the first substrate and the second substrate;
   wherein the electro-active element is configured to alter the optical power of at least a portion of the electro-active lens;
   wherein the first substrate comprises a different material than the second substrate;
   wherein the first substrate comprises a plastic material and wherein the second substrate comprises glass;
   wherein the first substrate has a front surface and a back surface;
   wherein the second substrate has a front surface and a back surface;
   wherein the front surface of the first substrate is disposed opposite to the back surface of the second substrate;
   wherein the back surface of the second substrate comprises a diffractive element or a pixilated element; and
   wherein the second substrate has an index of refraction that is approximately equal to the index of refraction of the electro-active element when the electro-active element is in an inactive state.

2. The electro-active lens of claim 1,
   wherein the front surface of the first substrate and the back surface of the second substrate define a first cavity; and
   wherein the electro-active element is disposed within the first cavity.

3. The electro-active lens of claim 1, further comprising an adhesive layer that is disposed between the first substrate and the second substrate, wherein the first substrate and the second substrate are coupled together by the adhesive layer.

4. The electro-active lens of claim 3, wherein the adhesive layer comprises any one of the following: urethane prepolymers, thio-urethane prepolymers, vinyl resins, thiols, allylic or vinyl phenols, acrylic monomers and oligomers, photo-initiators, stabilizers and inhibitors, naphthalene compounds, or silanes.

5. The electro-active lens of claim 1, wherein the first substrate has an index of refraction that is at least 10% different than the index of refraction of the second substrate.

6. The electro-active lens of claim 1, wherein the first substrate has a coefficient of thermal expansion that is at least approximately 10% different than the coefficient of thermal expansion of the second substrate.

7. The electro-active lens of claim 1, wherein the first substrate has a flexural strength that is at least approximately 10% different than the flexural strength of the second substrate.

8. The electro-active lens of claim 1, wherein the first substrate has a coefficient of linear thermal expansion between approximately $5 \times 10^{-5}$ and $7 \times 10^{-5}/°$ C.;
   wherein the second substrate has a coefficient of linear thermal expansion between approximately $7 \times 10^{-5}$ and $9 \times 10^{-5}/°$ C.;
   wherein the first substrate has a flexural strength between approximately 10,000 and 15,000 PSI; and
   wherein the second substrate has a flexural strength between 15,000 and 20,000 PSI.

9. The electro-active lens of claim 1, further comprising a diffractive element or a pixilated element.

10. The electro-active lens of claim 1, wherein the front surface of the first substrate comprises a diffractive element or a pixilated element.

11. The electro-active lens of claim 10, wherein the first substrate has an index of refraction and a refractive index (RI) dispersion that matches the index of refraction and refractive index dispersion of the electro-active element when in an inactive state.

12. An electro-active lens, comprising:
    a first substrate;
    a second substrate; and
    an electro-active element disposed between the first substrate and the second substrate;
    wherein the electro-active element is configured to alter the optical power of at least a portion of the electro-active lens;

wherein the first substrate comprises a different material than the second substrate;

wherein the first substrate comprises a plastic material and wherein the second substrate comprises glass;

wherein the first substrate has a front surface and a back surface;

wherein the second substrate has a front surface and a back surface;

wherein the front surface of the first substrate is disposed opposite to the back surface of the second substrate; and wherein the first substrate has a thickness that is between approximately 1 and 3 mm; and wherein the second substrate has a thickness between approximately 0.1 and 1 mm.

13. The electro-active lens of claim 1, wherein the first substrate comprises a progressive addition surface.

14. An electro-active lens, comprising:

a first substrate;

a second substrate; and an electro-active element disposed between the first substrate and the second substrate;

wherein the electro-active element is configured to alter the optical power of at least a portion of the electro-active lens;

wherein the first substrate comprises a different material than the second substrate;

wherein the first substrate comprises a first plastic material and wherein the second substrate comprises a second plastic material, wherein the first plastic material and the second plastic material are different;

wherein the first substrate has a front surface and a back surface;

wherein the second substrate has a front surface and a back surface;

wherein the front surface of the first substrate is disposed opposite to the back surface of the second substrate;

wherein the front surface of the first substrate comprises a diffractive element or a pixilated element; and wherein the first substrate has an index of refraction that is approximately equal to the index of refraction of the electro-active element when in an inactive state.

15. An electro-active lens, comprising:

a first substrate;

a second substrate; and an electro-active element disposed between the first substrate and the second substrate;

wherein the electro-active element is, configured to alter the optical power of at least a portion of the electro-active lens;

wherein the first substrate comprises a different material than the second substrate;

wherein the first substrate comprises a first elastic material and wherein the second substrate comprises a second plastic material, wherein the first plastic material and the second plastic material are different;

wherein the first substrate has a front surface and a back surface;

wherein the second substrate has a front surface and a back, surface;

wherein the front surface of the first substrate is disposed opposite to the back surface of the second substrate;

wherein the back surface of the second substrate comprises a diffractive element or, a pixilated element; and wherein the second substrate has an index of refraction that is approximately equal to the index of refraction of the electro-active element when in an inactive state.

16. An electro-active lens, comprising:

a first substrate;

a second substrate; and an electro-active element disposed between the first substrate and the second substrate;

wherein the electro-active element is configured to alter the optical power of at least a portion of the electro-active lens;

wherein the first substrate comprises a different material than the second substrate;

wherein the first substrate comprises a first plastic material and wherein the second substrate comprises a second plastic material, wherein the first plastic material and the second plastic material are different;

wherein the first substrate has a front surface and a back surface;

wherein the second substrate has a front surface and a back surface;

wherein the front surface of the first substrate is disposed opposite to the back surface of the second substrate; and wherein the first substrate has a thickness that is between approximately 0.3 mm and 0.7 mm; and wherein the second substrate has a thickness between approximately 0.5 mm and 2.5 mm.

17. The electro-active lens of claim 14, wherein the first substrate comprises a progressive addition surface.

* * * * *